United States Patent [19]

Extine

[11] 4,108,421
[45] Aug. 22, 1978

[54] LEVELING UNIT FOR PARKED VEHICLES

[75] Inventor: James M. Extine, Roseville, Ohio

[73] Assignee: The Raymond Lee Organization, Inc., New York, N.Y.

[21] Appl. No.: 858,258

[22] Filed: Dec. 7, 1977

[51] Int. Cl.² ............................................. E02C 3/00
[52] U.S. Cl. ................................................. 254/88
[58] Field of Search .................... 254/88, 94; 248/23, 248/188.2, 352; 188/32, 36

[56] References Cited

U.S. PATENT DOCUMENTS

| 3,178,156 | 4/1965 | Rigers | 254/88 |
| 3,295,829 | 1/1967 | Tarr | 254/88 |
| 3,630,487 | 12/1971 | Wechter | 254/88 |
| 3,661,229 | 5/1972 | Stonhaus | 188/32 |
| 4,013,268 | 3/1977 | Williams | 254/88 |

Primary Examiner—Robert C. Watson
Attorney, Agent, or Firm—Howard I. Podell

[57] ABSTRACT

A leveling unit for parked vehicles — such as house trailers or mobile homes or recreational vehicles — which includes a horizontal stand having a manual vertically adjustable wheel support ramp with a wheel engaging surface and ground engaging means under the stand. A level or plumb line on the vehicle indicates which of its side needs leveling and the unit is placed under the tire on the low side by driving the wheel of the vehicle up the ramp.

4 Claims, 7 Drawing Figures

LEVELING UNIT FOR PARKED VEHICLES

FIELD OF THE INVENTION

This invention relates generally to a leveling unit for parked vehicles such as recreational vehicles.

STATEMENT OF PRIOR ART

The prior art, as exemplified by U.S. Pat. Nos. 3,606,247; 3,885,813; 3,990,681; 3,915,471; 3,692,329 and 3,754,777 is generally illustrative of various devices of this type. While such devices are generally acceptable for their intended purpose they have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a leveling unit for parked vehicles — such as house trailers or mobile homes or recreational vehicles — which includes a horizontal stand having a manual vertically adjustable wheel support ramp with a wheel engaging surface and ground engaging means under the stand. A level or plumb line on the vehicle indicates which of its side needs leveling and the unit is placed under the tire on the low side by driving the wheel of the vehicle up the ramp.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
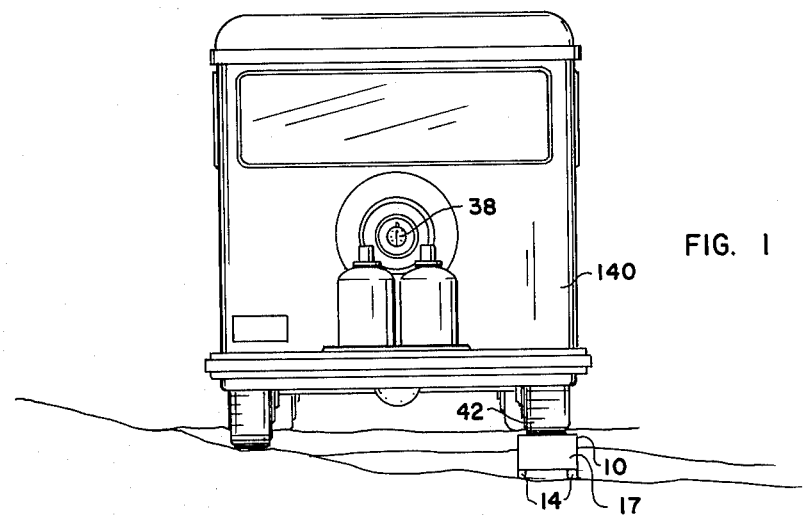
FIG. 1 is a view in perspective showing use of the unit of the invention.
Figure 2:
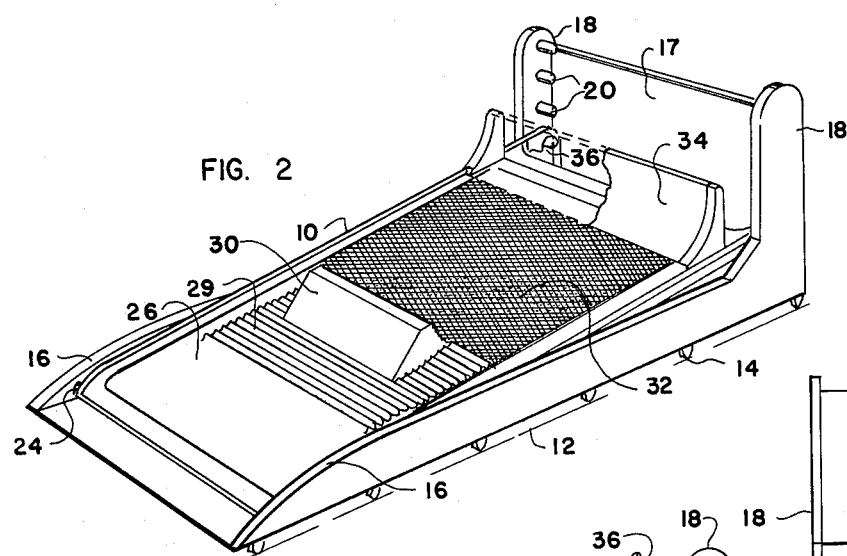
FIG. 2 is a view in perspective of a preferred embodiment of the invention.
Figure 5:
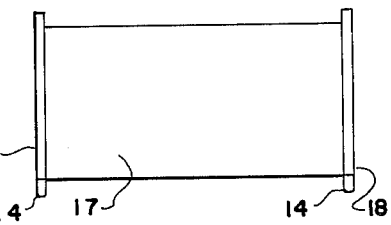
FIG. 5 is a front elevation of same.

With reference to the drawing, there is shown and illustrated a leveling unit constructed in accordance with the principles of the invention and designated generally by reference character 10. The particular device represented includes a wood or plastic stand 12 having studs 14 or other ground-engaging means on its bottom and sides 16 terminating in a front wall united with vertical front brackets 18. On each bracket are mounted at one inch intervals a plurality of oppositely facing height-adjusting lugs 20.

The back of sides 16 has slots 22 in which are slidably mounted pins 24 extending from the back of ramp 26.

Figure 3:
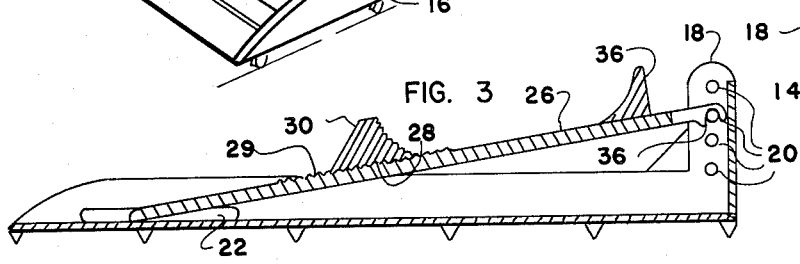
FIG. 3 is a sectional view thereof.
Figure 6:
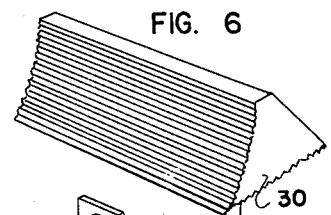
FIG. 6 is a view in perspective of a wedge used with the unit.
Figure 4:
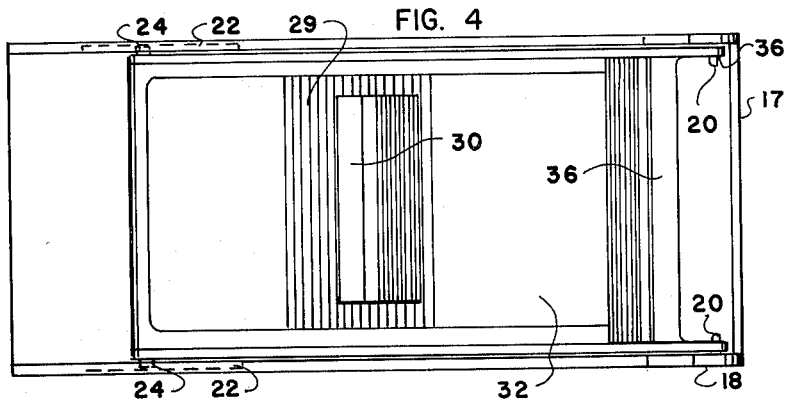
FIG. 4 is a top plan view thereof.

As shown in greater detail in FIG. 3, ramp 26 is generally flat and has on its floor corrugations 29 adapted for engagement with complementary corrugations 28 on the undersurface of a separate hard rubber wedge 30. The ramp floor also has tire-engaging abrasive material 32 thereon. Near the front end of ramp 26 is fixed an arched tire engaging member 34. The front end of the ramp is provided with down-turned hooks 36 which can engage lugs 20 on sides 18.

Figure 7:
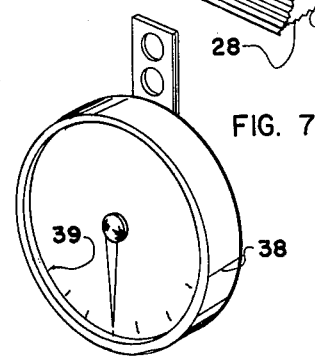
FIG. 7 is a view in perspective of a level for use with the unit of the invention.

Preferably, a level indicator 38 (FIG. 7) is mounted on vehicle 40 (FIG. 1) with the markings 39 of indicator 38 indicating the particular lugs 20 to which hooks 36 should be latched in order to incline the ramp to the desired height to compensate for an out-of-level position of the vehicle. Preferably also the device of the invention is twenty-eight inches long and nine inches wide. For mobile homes, the width should be increased to fit two wheels, mounted side-by-side.

Use of the present invention is very simple and involves raising one side of a vehicle 40 by driving a wheel of the vehicle up ramp 26 until the tire engages arched member 34 with ramp 26 adjusted to the proper height on lugs 20. Then wedge 30 is placed on the other side of the tire to lock the tire of the wheel in place.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A leveling unit for parked vehicles comprising a generally horizontal stand having a vertical front end; ground-engaging means under said stand; a vertically adjustable tire-supporting ramp mounted on said stand; a plurality of spaced fastening means on said front end cooperating with means integral with the front end of said ramp for securing said ramp at a desired angle to said stand; curved, tire-hugging means near said front of said ramp for engaging one side of a vehicle tire and a wedge means for engaging the other side of said tire to prevent movement thereof.

2. The invention as recited in claim 1, wherein said ramp has corrugations on the top surface thereof said wedge means having cooperating corrugations thereon.

3. The invention as recited in claim 1, wherein said means integral with said front end of said ramp consist of hooks.

4. The invention as recited in claim 1, wherein said stand has upstanding sides with opposed slots at one end thereof and said ramp has outwardly projecting pins slidably engaged in said slots for vertical adjustment of said ramp relative to said stand.

* * * * *